United States Patent [19]

Sevier

[11] Patent Number: 5,363,613
[45] Date of Patent: Nov. 15, 1994

[54] RIGID SUPPORTING STRUCTURES

[75] Inventor: Richard W. Sevier, Goleta, Calif.

[73] Assignee: Hendry Mechanical Works, Goleta, Calif.

[21] Appl. No.: 849,897

[22] Filed: Mar. 12, 1992

[51] Int. Cl.$^5$ ............................................. E04B 1/00
[52] U.S. Cl. ..................................... 52/263; 108/115; 108/130; 248/174; 52/631; 52/108
[58] Field of Search .................. 52/126.1, 126.4–126.6, 52/263, 108, 648.1, 631; 29/34 R, 897.3, DIG. 3, DIG. 13; 248/174; 108/115, 121, 128, 130

[56] References Cited

U.S. PATENT DOCUMENTS

| | | |
|---|---|---|
| Re. 12,973 | 6/1909 | Hendricks . |
| 1,621,245 | 3/1927 | Flowers . |
| 1,737,821 | 12/1929 | Anderson . |
| 1,949,913 | 3/1934 | Larkin . |
| 2,240,024 | 4/1941 | Stone . |
| 3,438,345 | 4/1969 | Lasaine et al. ............... 108/115 |
| 3,490,394 | 1/1970 | Perkins et al. ............... 108/115 |
| 3,592,143 | 7/1971 | Krone ............................ 108/115 |
| 3,766,864 | 10/1973 | Baker et al. .................. 108/111 |
| 4,630,740 | 12/1986 | Belokin ......................... 248/174 |
| 4,632,345 | 12/1986 | Barley ........................ 108/111 X |
| 4,860,667 | 8/1989 | Cardenas ..................... 108/115 |
| 4,893,441 | 1/1990 | Catalano et al. . |
| 4,930,277 | 6/1990 | Krumholz ..................... 52/263 |
| 4,996,804 | 3/1991 | Naka ........................ 52/263 X |
| 5,004,107 | 4/1991 | Sevier et al. . |
| 5,072,557 | 12/1991 | Naka ........................ 52/263 X |
| 5,121,593 | 6/1992 | Forslund ....................... 52/631 |
| 5,170,550 | 12/1992 | Cox ......................... 29/897.3 X |

FOREIGN PATENT DOCUMENTS

| | | |
|---|---|---|
| 0138236 | 4/1985 | European Pat. Off. . |
| 0320413 | 6/1989 | European Pat. Off. . |
| 2199599 | 7/1988 | United Kingdom . |

OTHER PUBLICATIONS

Leaflet entitled Super Heavy Duty Access Floor (Nov. 1988), by Unistrut Corporation.
Brochure entitled Access Floor Systems (May 1989), by Unistrut Corporation.
Brochure entitled Innovations in Access Flooring (1988), by C-TEC, Inc.
Leaflet entitled Surfacing for Access Floor Systems (Aug. 1989), by C-TEC, Inc.
Flier entitled Air Flow Access Flooring Panels (1989), by C-TEC, Inc.
Brochure entitled General Office Applications (1989), by USG Interiors, Inc.
Brochure entitled Access Floor Systems (Jan. 1990), by USG Interiors, Inc.

*Primary Examiner*—Carl D. Friedman
*Assistant Examiner*—Beth A. Aubrey
*Attorney, Agent, or Firm*—Benoit Law Corporation

[57] ABSTRACT

A supporting structure of one piece of sheet material constituting a top and several legs depending from that top in one piece has for each of these several legs an angled profile of that one piece of sheet material and in one piece with the top across the entire profile. Such supporting structure may be made of a blank of sheet material forming a pattern having a central portion for the top, first and second portions projecting from a first side of that central portion for first and second legs, third and fourth portions projecting from an opposite second side of the central portion for third and fourth legs, and first and second side panel portions projecting from opposed third and fourth sides of the central portion. These first, second, third and fourth portions are provided, respectively, with lateral ledges of which each is spaced from an adjacent one of the first and second side panel portions by a notch for a butt joint of each of the lateral ledges with an adjacent side panel portion. Angled structures may be formed for legs from the first, second, third and fourth portions of such blank with lateral ledges.

44 Claims, 4 Drawing Sheets

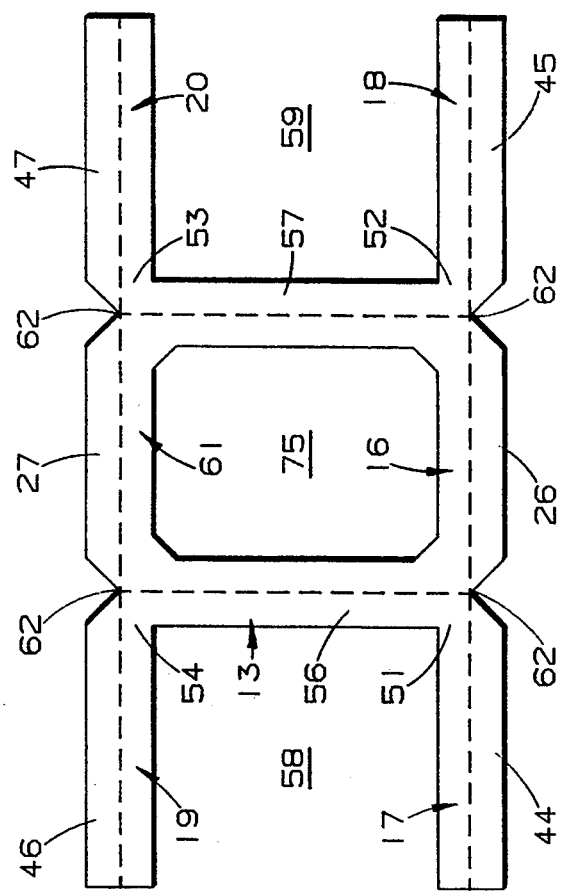
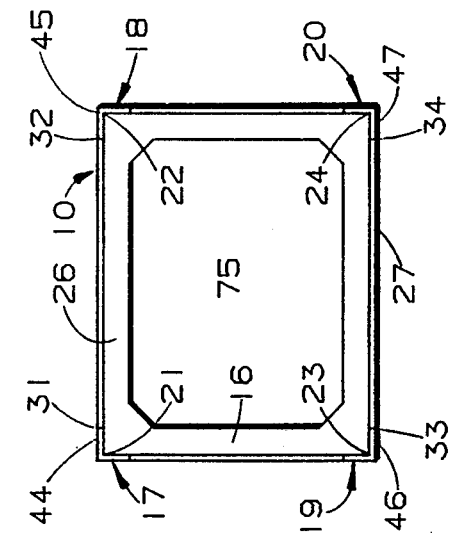
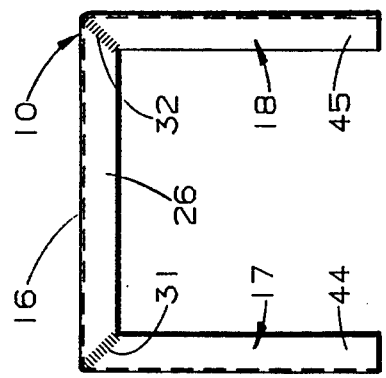
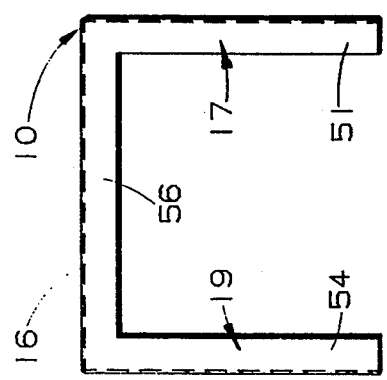

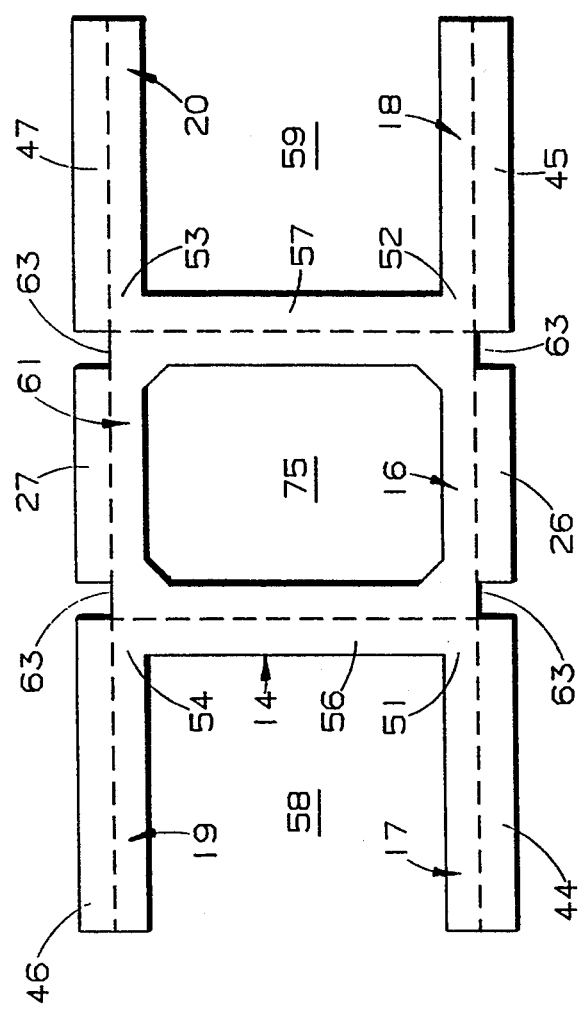
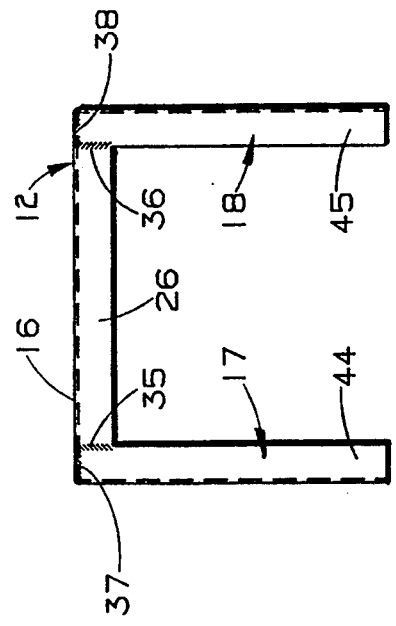
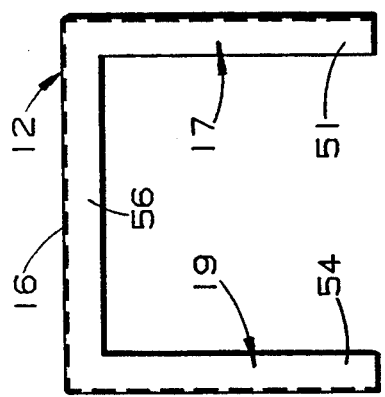

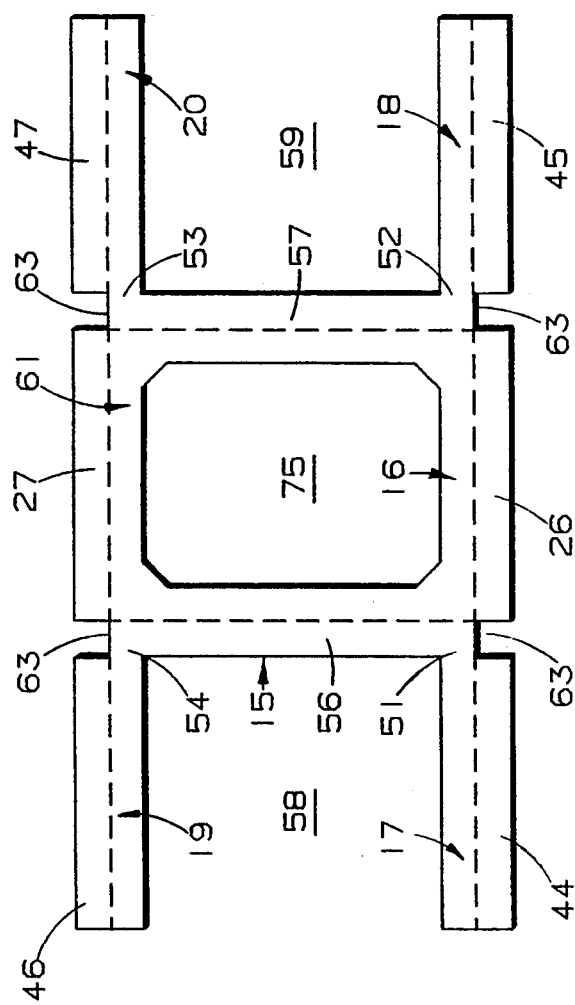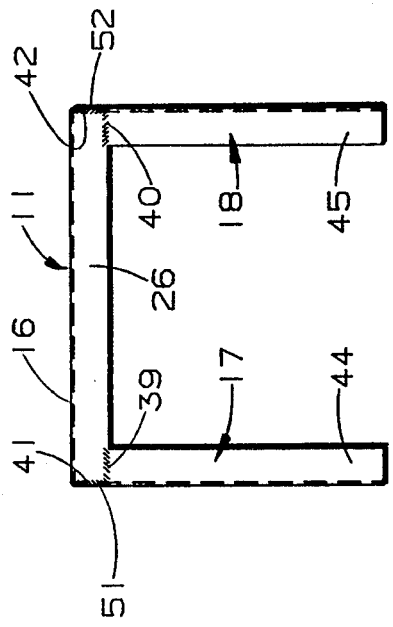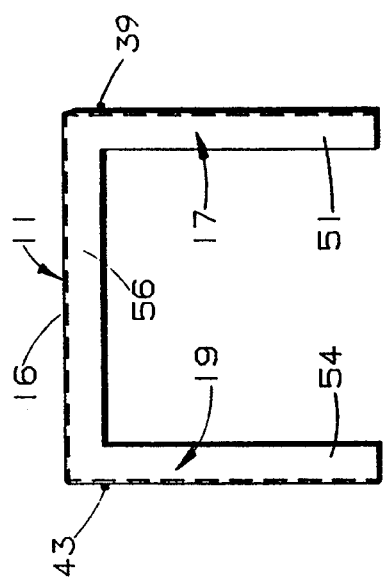

RIGID SUPPORTING STRUCTURES

FIELD OF THE INVENTION

The subject invention relates to rigid supporting structures for all kinds of applications, including floors, apparatus and sundry equipment, and to methods and sheet material blanks for making them.

BACKGROUND OF THE INVENTION

There always has been a need for better supporting structures and several factors have cooperated in increasing the need for more rigid supporting structures that will stand up under all kinds of foreseen and unforeseen conditions.

By way of example, more and more electronic and computer equipment is being located on a so-called computer floor under which all kinds of cables and other conduits run back and forth. Reference may in this respect be had to materials by UNISTRUT CORPORATION, including a leaflet entitled SUPER HEAVY DUTY ACCESS FLOOR (November 1988) and showing an isometric view of a raised floor support system, and a brochure entitled ACCESS FLOOR SYSTEMS (May 1989).

Reference may also be had to publications of C-TEC, INC., including a brochure entitled INNOVATIONS IN ACCESS FLOORING (1988), a leaflet entitled Surfacing for Access Floor Systems (August 1989), and a flier entitled Air Flow Access Flooring Panels (1989).

Reference may further be had to materials of USG Interiors, Inc., including a brochure entitled General Office Applications (1989), and a brochure entitled Access Floor Systems (January 1990).

These prior-art efforts appear to have a design in common in which arrays of floor stringers are supported by an array of spaced single-leg pedestals.

By way of further background, preservation of electronic equipment during earthquakes and aftershocks for the maintenance of communications and other purposes is a major concern of earthquake preparedness. Indeed, alleviation of damage and suffering depends to a large extent on the maintenance of the telephone system and broadcast facilities, to name two examples.

With the introduction of electronic and fiber optic telephone switching equipment, the density of calls being handled in one equipment rack or network bay has advanced significantly. Today as many as 20,000 telephone lines could be interrupted with the loss of one bay of equipment. This has made the reliability of telephone switch equipment and its supporting structure critically important. Concern for earthquake protection of this equipment has become very important.

Similar concerns have arisen in the private and public utility field, where generating and electric and gas supply systems should continue to be operative in the wake of earthquakes and other calamities. In that respect, there is even a concern that damage and injury may come from power generating or supply equipment that may, for instance, break up if not rigidly supported during earthquakes and other dangerous incidents.

Moreover, the access flooring itself can constitute a danger, if it should break up and thereby prevent or endanger an escape of people from an endangered or damaged room or building.

There also is a need for rigid supporting structures, such as in raised floors or access floor systems, for the type of earthquake braced racks disclosed in U.S. Pat. No. 5,004,107, by Richard W. Sevier and James J. Keenan, issued Apr. 2, 1991 to the common assignee hereof.

SUMMARY OF THE INVENTION

It is a general object of this invention to meet the needs expressed or implied hereinabove or hereinafter.

It is a germane object of the invention to provide improved rigid supporting structures.

It is a related object of the invention to provide rigid supporting structure modules that are free of external discontinuities that would interfere with their use in access floor systems and other assemblies.

It is also an object of the invention to facilitate or improve the provision of cables or other conduits in access floor systems or other structures.

It is also an object of the invention to provide improved access floor structures.

It is also an object of this invention to provide earthquake braced foundations for floors, cabinets, racks and all kinds of apparatus.

It is a related object of the invention to provide improved methods for making rigid supporting structures.

It is a related object of the invention to construct rigid supporting structures with butt joints.

It is also an object of the invention to provide sheet metal blanks for making supporting structures, preferably by a butt joint technology.

Other objects of the invention will become apparent in the further course of this disclosure.

The invention resides in a rigid supporting structure having a top and several legs, comprising, in combination, one piece of sheet material constituting a top and several legs depending from that top in one piece; each of these several legs having an angled profile of that one piece of sheet material and in one piece with the top across the entire profile. That supporting structure includes side panels of the one piece of sheet material, each of these side panels depending from the top and extending between two of the several legs in one piece with the angled profiles of such two legs, with each of such side panels solidly interconnected by a butt joint with each of those two legs.

The invention resides also in computer floors and other structures including one or more of such supporting structures.

The invention resides also in a method of making from sheet material a rigid supporting structure having legs and a top, comprising, in combination, providing from that sheet material a pattern having a central portion for the top, first and second portions projecting from a first side of the central portion for first and second ones of the legs, third and fourth portions projecting from an opposite second side of the central portion for third and fourth ones of the legs, and first and second side panel portions projecting from opposed third and fourth sides of the central portion; these first, second, third and fourth portions being provided, respectively, with lateral ledges of which each is spaced from an adjacent one of the first and second side panel portions by a notch extending to the central portion for a butt joint of each of the lateral ledges with an adjacent side panel portion. The method further includes forming angled structures for the legs from the first, second, third and fourth portions with lateral ledges, orienting such angled structures relative to the central portion to provide the top with legs while closing the notch by moving each of the lateral ledges into butt joint abutment with its adjacent side panel portion, forming the side panel portions into side panels for the top between the legs, and solidly interconnecting the side panel portions by butt joints with next-adjacent ones of the lateral ledges of the first, second, third and fourth portions.

The invention also resides in a blank of sheet material for a rigid supporting structure having legs and a top, comprising, in combination, a pattern having a central portion for the top, first and second portions projecting from a first side of the central portion for first and second ones of the legs, third and fourth portions projecting from an opposite second side of the central portion for third and fourth ones of the legs, and first and second side panel portions projecting from opposed third and fourth sides of the central portion; these first, second, third and fourth portions being provided, respectively, with lateral ledges of which each is spaced from an adjacent one of the first and second side panel portions by a notch extending to the central portion for the top for a butt joint of each of the lateral ledges with an adjacent side panel portion.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which:

FIG. 1 is an elevation of a rigid supporting structure according to an embodiment of the invention;

FIG. 2 is a side view of the supporting structure FIG. 1;

FIG. 3 is a bottom view of the supporting structure according to FIGS. 1 and 2;

FIG. 4 is a development on a plane of the supporting structure of FIGS. 1 to 3, and also is a plan view of a blank for making such supporting structure;

FIGS. 5, 6 and 7 are views similar to FIGS. 1, 2 and 4, respectively, but of a supporting structure and blank according to a preferred embodiment of the invention;

FIGS. 8, 9 and 10 are views similar to FIGS. 5, 6 and 7, respectively, but of a supporting structure and blank according to another preferred embodiment of the invention.

DESCRIPTION OF PREFERRED EMBODIMENTS

Figure 11:
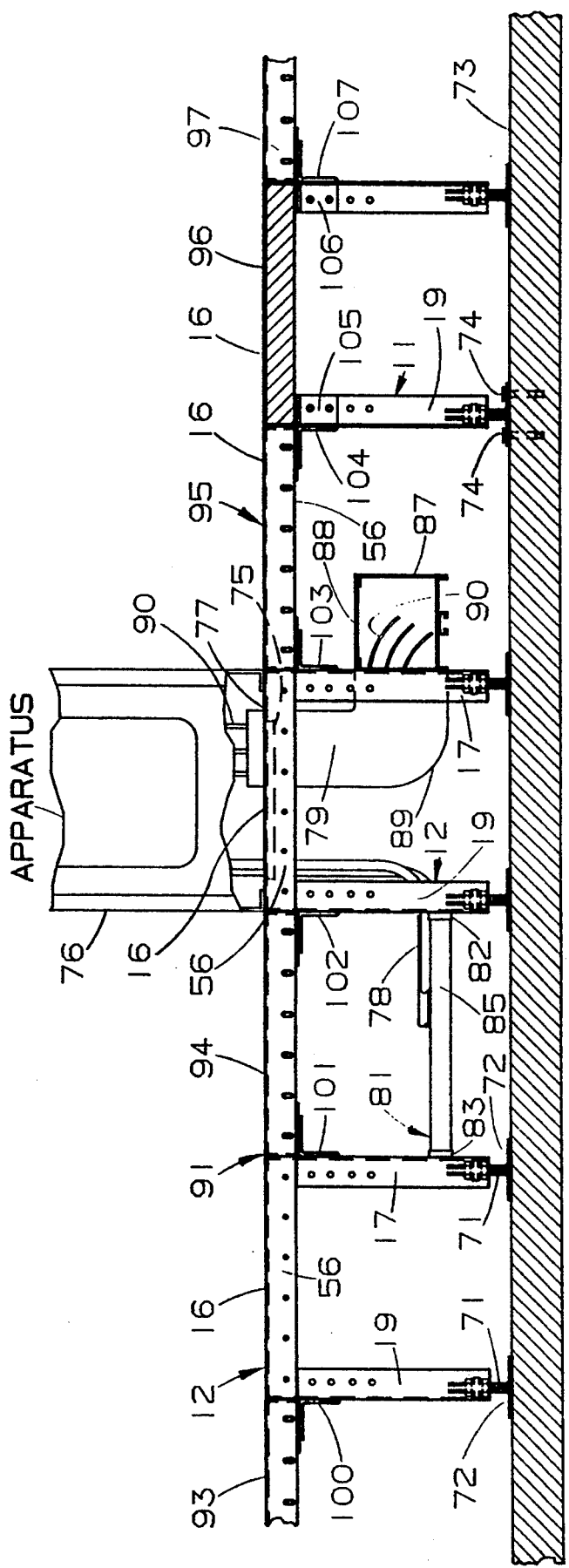
FIG. 11 is an elevation, partially in section, of an access floor system or other overall supporting structure and of cable and conduit systems, all according to embodiments of the invention.

The drawings show supporting structures 10, 11 and 12, each consisting or made of one piece of sheet material 13, 14 and 15, respectively, constituting a top 16 and several legs 17, 18, 19 and 20 depending from that top in one piece. By way of example and not by way of limitation, FIGS. 3, 9 and 6 show instances of such one piece in plan view or in developed plan view projection.

Each of such several legs 17, 18, 19 and 20 has an angled profile made of the one piece of sheet material 13, 14 and 15, respectively, and in one piece with the top 16 across such entire profile. The angled profiles are best seen at 21, 22, 23 and 24 in FIG. 3 and by way of example, comprise for each leg a single angle at each of 17, 18, 19, and 20 which may be the same for all legs. In this respect and in general, the bottom view of FIG. 3 may serve as the bottom view for all supporting structures 10, 11 and 12, for example.

The supporting structures preferably include side panels 26 and 27 made of the one piece of sheet material 13, 14 or 15. Each of these side panels depends from the top 16 and extends between two of the several legs, such as legs 17 and 18 or legs 19 and 20, in one piece with the angled profile of 21, 22 or 23, 24 of such two legs.

The expression "top" is herein used as a relative term. Indeed, that may be the top of the supporting structure as shown in FIGS. 1 to 3, 5, 6, 8 and 9. Conversely, 16 may be the side or even the bottom of the supporting structure, as shown for the supporting structure 10 in FIG. 3, all depending on the actual use of the supporting structure in different applications.

Each of the side panels 26 and 27 is solidly interconnected by a butt joint with each of the two legs, such as seen at 31 to 43 in the drawings.

According to the embodiment of FIGS. 1 to 4, each of the side panels 26 and 27 is mitered with a section 44, 45, 46 or 47 of the angled profile 21, 22, 23 or 24 of each of the two legs 17 and 18 or 19 and 20. While such mitering can take several forms within a broad meaning of that term, FIG. 2 shows a most simple miter requiring only one straight weld or other solid interconnection per leg. Because such slanted welds are at butt joints 31 to 34, they afford great strength against compressive forces, such as when outside forces act on either of the legs 17 and 18 in the direction of the other leg 18 or 17, or on either of the legs 19 and 20 in the direction of the other leg 20 or 19, or vice versa. The miter welds or butt joints 31 to 34 also afford good resistance to shearing forces, but a somewhat reduced resistance to tension forces occurring when either of the legs 17 and 18 is stressed in a direction away from the other leg 18 or 17, or when either leg 19 and 20 is stressed in a direction away from the other leg 20 or 19, or vice versa.

Accordingly, from that point of view, FIGS. 1 to 4 illustrate the least preferred embodiment as among FIGS. 1 to 10, for supporting structures exposed to stresses of the latter type.

A more preferred embodiment for all kinds of stresses is shown in FIGS. 5 to 7, wherein the side panel 26 abuts and is solidly interconnected with a first section 44 or 45 of the angled profile 21 or 22 of each of the two legs 17 and 18, such as by welds or butt joints 35 and 36, and wherein the first section 44 or 45 of the angled profile of each of the two legs 17 and 18 is solidly interconnected with the top 16, such as by welds or joints 37 and 38.

The side panel 27 preferably is interconnected with a first section 46 and 47 of the angled profile 23 and 24 of the two other legs 19 and 20, and such first sections 46 and 47 preferably are interconnected with the top 16 in the same manner as shown and described for the side panel 26 and leg sections 44 and 45 in FIG. 9.

In practice, this provides excellent supporting performance against all kinds of compression, shearing and stress forces occurring during all kinds of earthquakes and other calamities.

Another high-performance embodiment is shown in FIGS. 8 to 10, wherein each of the side panels 26 and 27 extends across and is solidly interconnected with a first section 44, 45, 47 or 48 of the angled profile 21, 22, 23 or 24 of each of the two legs 17 and 18 or 19 and 20, as shown in FIG. 9 for the side panel 26 and legs 17 and 18; the view for the side panel 27 and legs 19 and 20 being essentially the same as in FIG. 9. Butt joint welds or other solid butt joint interconnections 39, 40 and the like may be used for this purpose.

The same applies to the remainder of FIG. 9 where welds or other solid interconnections 41 and 42 are shown to illustrate how each of the side panels 26 and 27 is solidly interconnected with a second section 51, 52, 53 or 54 of the angled profile 21, 22, 23 or 24 of each of the two legs 17 and 18 or 19 and 20.

A butt weld or other solid interconnection 43 is seen in FIG. 8 as corresponding to butt weld or interconnection 39. As seen in FIG. 2, the butt joint 31 or 32 extends to the top 16 at an angle to that top. Conversely, as seen in FIG. 9, the butt joint 51 or 56 extends parallel to the top 16. Moreover, as seen in FIG. 6, a butt joint 35 or 36 extends to the top 16 between each of the side panels 26 and 27 and each of the legs 17, 18, 19 and 20. FIGS. 6 and 9 show a pair of butt joints 35/37, 36/38, 39/41 or 40/42 solidly interconnecting each of the side panels 26 or 27 with each of the two legs 17 and 18 or 19 and 20. As seen in FIGS. 6 and 9, such butt joints extend at angles to each other and extend between the side panel 26 and the legs 17 and 18 and the top 16. In fact, the butt joints 35/37, 36/38, 39/41 or 40/42 extend at right angles to each other in the embodiment of FIGS. 6 and 9. As also seen in FIG. 9, the butt joints 35/37, 36/38, 39/41 or 40/42 extend between each of the side panels 26 and 27 and an adjacent one of the legs 17, 18, 19 or 20 and between a portion 44 or 45 of that adjacent one leg and the top 16.

FIGS. 5 to 7 illustrate the best mode contemplated by applicant of carrying out his invention, particularly in an earthquake-prone environment. The embodiment of FIGS. 8 to 10 comes close to what applicant considers the best mode. The mitered embodiment of FIGS. 1 to 4 appears easiest to manufacture, but is not considered to be on a par with the embodiments of FIGS. 5 to 10 in terms of earthquake resistance.

For increased rigidity and performance, one or more additional side panels may be provided. In particular, the supporting structure may include between each two of the legs 17 and 18, 19 and 20, 17 and 19, and 18 and 20 a side panel 26, 27, 56, and 57, respectively, made of the one piece of sheet material 13, 14 or 15 and in one piece with the top 16 and such two of the legs or in one piece with all of the legs for that matter. This preferred feature of having a side panel between any two of the legs applies whether the supporting structure has two, three, four, five or more legs.

In the illustrated embodiments, the legs are four in number. In that case it may be said that a first side panel 56 depends from the top 16 on a first side 58 and extends between first and second ones of the four legs, such as legs 17 and 19, in one piece of sheet material 13, 14 or 15, while a second side panel 57 depends from the top 16 on an opposite second side 59 and extends between third and fourth ones of the four legs, such as the legs 18 and 20, in that one piece of sheet material 13, 14 or 15. As seen from FIGS. 1, 5 and 8, and from corresponding portions in FIGS. 4, 7 and 10, leg sections 44, 46, 51 and 54, side panel 56 and top 16 and leg sections 45, 47, 52 and 53 and top 16 all are in one piece without intervening welds or interconnections.

A third side panel 26 depends from the top 16 in that one piece of sheet material 13, 14 or 15 on a third side laterally of the first and second sides 58 and 59, and extends between and in solid interconnection with said first and third legs 17 and 18, while a fourth side panel 27 depends from the top 16 in that one piece of sheet material 13, 14 or 15 on a fourth side opposite that third side, and extends between and in solid interconnection with the second and fourth legs 19 and 20.

These third and fourth side panels may be solidly interconnected by butt joints or welds for instance as shown at 31 to 34, 35 to 38, and 39 to 43 and as described above with respect to side panels 26 and 27.

The scope of the embodiment shown in FIGS. 1, 2, 3, 5, 6, 8 and 9 is not intended to be limited to any mode of manufacture. On the other hand, methods of manufacture are within the scope of the invention.

In this respect, FIGS. 1 to 10 show methods of making from sheet material 13, 14 or 15 a supporting structure 10, 11 or 12 having legs and a top 16.

That method proceeds from that sheet material a pattern having a central portion 61 for the top 16, first and second portions at 17 and 19 projecting from a first side 58 of that central portion for first and second legs, third and fourth portions at 18 and 20 projecting from an opposite second side 59 of the central portion for third and fourth legs, and first and second side panel portions 26 and 27 projecting from opposed third and fourth sides of that central portion 61.

The first, second, third and fourth portions at 17, 19, 18 and 20 are provided, respectively, with lateral ledges 44, 46, 45 and 47 of which each is spaced from an adjacent one of said first and second side panel portions 26 or 27 by a notch 62 or 63 for a butt joint of each of these lateral ledges with an adjacent side panel portion. The notch 62 or 63 extends to the central portion 61 for the top 16. By way of example, FIG. 4 shows V-shaped notches 62 extending to the central portion 61 for the top 16 for the mitered butt joints 31 to 34, while FIGS. 7 and 10 show rectangular notches extending to the central portion 61 for the top 16 63 for the butt joints 35 to 43.

The scope of the invention also extends to blanks, such as shown in FIGS. 4, 7 and 10, or otherwise having a pattern of that type, for making a supporting structure.

From the blanks or patterns 13 to 15, the embodiments of FIGS. 1 to 3, 5 and 6, and 8 and 9 may be formed, such as by bending along the dotted lines shown in FIGS. 4, 7 and 10.

In this or any other manner, angled structures for the legs 17, 18, 19 and 20, such as seen at 21, 22, 23 and 24 in FIG. 4, may be formed from the first, second, third and fourth portions with lateral ledges 44, 46, 45 and 47, respectively.

This method includes orienting such angled structures relative to the central portion 61 to provide the top 16 with legs 17, 18, 19 and 20, and forming the side panel portions 26 and 27 into side panels for the top between the legs, and solidly interconnecting such side panel portions 26 and 27 by butt joints 31, 32 or 35 to 43 with next-adjacent ones of the lateral ledges 44 to 47 of the first, second, third and fourth portions at 17 to 20, such as by welds or otherwise. As seen by comparing FIG. 4 with FIG. 2, FIG. 7 with FIG. 6, and FIG. 10 with FIG. 9, each notch 62 and 63 is closed by moving each of the lateral ledges 44, 45, 46 or 47 into a butt joint abutment with its adjacent side panel portion 26 or 27, as seen at 31 and 32 in FIG. 2, at 35 and 36 in FIG. 6, and at 39 and 40 in FIG. 9, for example.

As further described above, the lateral ledges 44 to 47 may be solidly interconnected with the top 16 after forming the angled structures 21, 22, 23 and 24, such as shown in FIG. 6 at 37 and 38.

As further described above with the aid of FIG. 10, the side panel portions 26 and 27 may be solidly interconnected with parts 51 to 54 of the first, second, third and fourth portions adjacent the lateral ledges 44 to 47 of such first, second, third and fourth portions at 17 to 20. If the further side panels 56 and 57 are present, then the parts 51 to 54 may be ends of such further side panels, with side panels 26, 27, 56 and 57 being not only seamlessly in one piece with each other and through and with the top 16, but being also braced together with each other through butt joints 41, 42, etc.

On the other hand, the side panel portions 26 and 27 may be mitered with lateral edges of said first, second, third and fourth portions 44 to 47, such as described above with the aid of FIGS. 1 to 4.

As shown in FIGS. 7 and 10, each of the lateral ledges 44 to 47 may be spaced from an adjacent one of said first and second side panel portions 26 and 27 by a distance corresponding to a height of that adjacent side panel portion, and such side panel portions may then be butt-jointed with such lateral ledges of said first, second, third and fourth portions at 17 to 20. As alternatively seen in FIGS. 7 and 10, the notch 63 may space each of the lateral ledges 44, 45, 46 or 47 from an adjacent one of the first and second side panel portions by a distance corresponding to a height of that adjacent side panel portion 26 or 27. In the case of FIG. 7 where each side panel portion 26 or 27 is shorter than in FIG. 10, it may be said as seen in FIG. 7 that the notch 63 spaces each of the first and second side panel portions from an adjacent one of the lateral ledges 44, 45, 46 or 47 by a distance corresponding to a width of that lateral ledge. In this respect, each of the first and second side panel portions 26 and 27 is spaced from an adjacent one of the lateral ledges 44, 45, 46 or 47 by a distance corresponding to a width of that lateral ledge, such as seen in FIGS. 6 and 7.

If each of the side panels 26 and 27 is shorter than the top 16 at each of its end by a notch corresponding in width to a height of that side panel, such as shown in FIG. 7, then lateral ledges 44 to 46 of the legs 17 to 20 may be solidly interconnected with that top 16, such as shown by way of example at 37 and 38 in FIG. 6.

On the other hand, if each of the side panel portions 26 and 27 is as wide as the top 16, such as shown in FIG. 10, then such side panel portions may be solidly interconnected with parts 51 to 54 of the first, second, third and fourth portions adjacent the lateral ledges 44 to 47 of such first, second, third and fourth portions at 17 to 20, such as described above with the aid of FIG. 9.

It may be noted that the joints shown in the drawings are butt joints rather than lap joints. In general, lap joints have the advantage of great strength and are thus favored by the prior art. However, lap joints add discontinuities to the structure and their provision often affects such factors as structural outline, contour and profile, rendering it difficult at times to meet space, configurational and compatibility requirements and constraints. The butt joints and their combinations herein disclosed preserve and promote a desired or required structural continuity, and straight or smooth outlines and contours, with overall profiles that lend themselves to multiple use of the disclosed supporting structures side by side in the same installation, and that enable use of the disclosed supporting structures in various configurations and combinations.

In all of the illustrated embodiments, a principle of the subject invention cleverly avoids all joints on sides 58 and 59, as may be seen from FIGS. 1, 5 and 8, for instance. This provides the disclosed supporting structures with great strength at least in those planes.

In this respect, the patterns at 13, 14 and 15 in FIGS. 4, 7 and 10 are provided with or have a third side panel portion 56 between and seamlessly integral with the legs 17 and 19, and a fourth side panel portion 57 between and seamlessly integral with the legs 18 and 20. These third and fourth side panel portions are also seamlessly integral with the central portion 61 for the top 16.

Even in the straightforwardly mitered embodiment of FIG. 2, the joints 31 and 32 are under compression when the legs 17 and 18 and their counterparts 19 and 20 are stressed inwardly in the plane of FIG. 2 or in a plane parallel thereto. Butt joints perform well under compression. On the other hand, as mentioned above, the embodiment of FIG. 2 is less favored than the other illustrated embodiments, since outward bending of the legs 17 and 18 or 19 and 20 could expose the straight miter joints 31 and 32 to tension.

The embodiments of FIGS. 5 to 10 effectively solve that problem by providing butt joint combinations wherein butt joints extend in different directions, such as the butt joints 35 and 37, and 39 and 41, at right angles to each other, countering tension stress at either joint by shearing and/or compression resistance at the other, while still leaving the supporting structure joint-free on sides 58 and 59 in the plane of FIGS. 5 and 8 and in planes parallel thereto. Thanks to the use and clever combination of butt joints, preferred embodiments of the subject invention permit the use of thick hot-rolled steel or other thick materials on the order of several millimeters or even in the inch range for the sheets of which the supporting structures are made.

Within the scope of the invention, the supporting structure may include adjustable feet for the legs, such as the adjustable feet 71 shown in FIG. 11, having base plates 72 resting on a concrete or other solid floor 73. Anchor bolts or other devices 74 may be used for attaching or fastening the supporting structures or feet to the floor.

In practice, the patterns at 13, 14 and 15 may be cut from thick sheet material in any suitable manner. Prototypes of the embodiments have been made by cutting patterns from heavy-gauge steel with a laser machine.

The same technique may, for example, be employed for providing the top 16 with an opening, such as the opening 75 shown in FIGS. 3, 4, 7 and 10 and implied in FIGS. 1, 2, 5, 6, 8, 9 and 11. This optional feature further increases the utility of the disclosed structures.

For instance, any of the supporting structures within the scope of the invention may have a rack, vessel, cabinet or apparatus, herein generally shown as a cabinet 76 located on the supporting structure and having an open bottom 77 on the supporting structure opening 75. One or more pipes, hoses, cables or other conduits may extend through the supporting structure and cabinet openings 75 and 77.

By way of example, FIG. 11 shows conduits 78 and 79 extending in between two of the legs, such as legs 17 and 18 (see FIGS. 2, 6 and 9 in relation to FIG. 11), and through the opening 77 in the top 16 and through the open bottom 77 into the cabinet 76. The conduit 78 may, for instance, be a cable 78, such as an electric or telephone cable, or a computer or video cable, to name just a few examples.

A support 81 of or for the conduit 78 may be on at least one of the legs, such as the leg 19 in FIG. 11. The support 81 may have two rails 82 and 83 running transversely of, and fastened to, legs 19 and 20, and 17 and 18, respectively, of two adjacent but spaced supporting structures.

A cable floor or crossbeams 85 may extend between the rails 82 or 83. The support 81 may thus be configured like a ladder lying horizontally. Cables and other conduits may thus be kept off the floor 73, which not only prolongs their life, but also keeps them from chafing on a hard or rough surface during earthquakes and the like.

For fiber optics and other applications, a channel is often more suitable than a cable support. By way of example, FIG. 11 shows a channel 87 extending along two of the legs, such as the legs 17 and 18 (see FIGS. 1, 5 and 8 in relation to FIG. 11) of the supporting structure, and being attached thereto or suspended therefrom.

The channel 87 may be accessible through a removable top 88 and may be part of a fiber optics raceway.

A conduit 79 in the form of a channel extension extends from the channel 87 laterally in between the two legs 17 and 18 and through the opening 75 in the top 16 and through the open bottom 77 into the cabinet 76. That channel extension 79 may have a curvature 89 between the channel 87 and the opening 16, such as shown in FIG. 11. Preferably, that curvature supports optical fibers 90 at an appropriate radius.

Optical fiber cables 90 may thus conveniently be run from, to and between various pieces of equipment.

The supporting structures 10, 11 and/or 12 may, for instance, serve as "islands" in computer floor structures 91. In this respect and in general, the expression supporting structure as herein employed is not limited to single tables or the like. To the contrary, several such tables or islands may be employed in a larger computer floor or other supporting structure 91.

For example, a larger supporting structure may include the so far mentioned one piece of sheet material 13, 14 or 15 as a first piece of sheet material constituting the above mentioned top 16 as a first top and the above mentioned several legs 17 to 20 as a first set of several legs in a first supporting structure 10, 11 or 12. =A second supporting structure interconnected with that first supporting structure and including a second piece of sheet material constituting a second top and a second set of several legs depending from that second top in one piece may be included in that larger structure. Simply put, there may be several of the supporting structures 10, 11 and/or 12 in a single computer floor or other support installation, such as shown in FIG. 11 sideways in one dimension.

Each leg of a second, third or further set of several legs 17 to 20 also has an angled profile 21 to 24 of the second, third or further piece of sheet material 13, 14, 15, etc. and in one piece with the second, third or fourth top 16 across the entire profile, such as shown above in FIG. 3, for instance.

Several supporting structures or islands 10, 11 or 12 may be tied together, such as by fasteners extending through some of the holes shown in the legs 17 and 19 and side panel 56 in FIG. 11. Several cabinets 76 housing terminals, switching equipment, computers and other apparatus or instruments may be provided on such tied-together or mutually spaced islands.

The supporting structure 91 may also include floor boards 93 to 97, etc. interconnecting or extending between the first, second and third supporting structures 11 and 12, for instance. Such floor boards may, for instance, be of wood, sheet metal or reinforced plastics. One or more of the floor boards, such as the floor board 95, may in fact be a supporting structure with a top 16 and side panels 26, 27, 56 and 57, but without legs 17 to 20, or with gussets (not shown) extending across the corners where the profiles 21 to 24 would start. The top 16 may have an opening 75 so that conduits can be run therethrough to equipment thereon (not shown). Alternatively, the top of the structure 95 or of any structure 10, 11 or 12 may be solid, especially if people are to walk thereon.

Various brackets 100 to 107 are shown in FIG. 11 for supporting the floor boards or similar structures 93 to 97.

The floor board 96 is shown sectioned in FIG. 11 to indicate that a typical computer floor or supporting structure 91 extends across a floor 73 in two dimensions, such as the width and the depth of a room, transversely to the height of the supporting structure 91.

The subject extensive disclosure will render apparent or suggest to those skilled in the art various modifications and variations within the spirit and scope of the subject invention and equivalents thereof.

I/We claim:

1. A rigid supporting structure having a top and several legs, comprising in combination:
   one piece of sheet material constituting said top and several legs depending from said top in one piece with said top;
   each of said several legs having an angled profile of said one piece of sheet material and in one piece with said top across the entire profile;
   side panels of said one piece of sheet material;
   each of said side panels depending from said top and extending between two of said several legs in one piece with the angled profiles of said two legs, with each of said side panels solidly interconnected by a butt joint with each of said two legs.

2. A supporting structure as in claim 1, wherein:
   each of said side panels extends across and is solidly interconnected by said butt joint with a first section of the angled profile of each of said two legs.

3. A supporting structure as in claim 2, wherein:
   each of said side panels is solidly interconnected with a second section of the angled profile of each of said two legs.

4. A supporting structure as in claim 1, wherein:
   each of said side panels abuts and is solidly interconnected by said butt joint with a first section of the angled profile of each of said two legs.

5. A supporting structure as in claim 4, wherein:
   said first section of the angled profile of each of said two legs is solidly interconnected by a butt joint with said top.

6. A supporting structure as in claim 1, wherein:
   each of said side panels is mitered at said butt joint with a section of the angled profile of each of said two legs.

7. A supporting structure as in claim 1, including:
   between each two of said legs a side panel of said one piece of sheet material and in one piece with said top and said two of said legs.

8. A supporting structure as in claim 7, wherein:
each of said third and fourth side panels is mitered at one of said butt joints with a section of the angled profile of each of said and third legs and second and fourth legs.

9. A supporting structure as in claim 1, wherein:
said legs are four in number;
a first side panel depends from said top on a first side and extends between first and second ones of said four legs in said one piece of sheet material;
a second side panel depends from said top on an opposite second side and extends between third and fourth ones of said four legs in said one piece of sheet material;
a third side panel depends from said top in said one piece of sheet material on a third side laterally of said first and second sides, and extends between and in solid interconnection with said first and third legs; and
a fourth side panel depends from said top in said one piece of sheet material on a fourth side opposite said third side, and extends between and in solid interconnection with said second and fourth legs;
said third and fourth side panels solidly interconnected by butt joints with said first and third legs and with said second and fourth legs, respectively.

10. A supporting structure as in claim 9, wherein:
each of said third and fourth side panels abuts and is solidly interconnected by a butt joint with a first section of the angled profile of each of said first and third legs and second and fourth legs, respectively.

11. A supporting structure as in claim 10, wherein:
said first section of the angled profile of each of said first and third legs and second and fourth legs is solidly interconnected by a butt joint with said top.

12. A supporting structure as in claim 9, wherein:
each of said third and fourth side panels extends across and is solidly interconnected by a butt joint with a first section of the angled profile of each of said first and third legs and second and fourth legs, respectively.

13. A supporting structure as in claim 12, wherein:
each of said third and fourth side panels is solidly interconnected by a butt joint with a second section of the angled profile of each of said first and third legs and second and fourth legs, respectively.

14. A supporting structure as in claim 1, wherein:
said butt joint extends to said to at an angle to said top.

15. A supporting structure as in claim 1, wherein:
said butt joint extends parallel to said top.

16. A supporting structure as in claim 1, wherein:
a butt joint extends to said top between each of said side panels and each of said legs.

17. A supporting structure having a top and several legs, comprising in combination:
one piece of sheet material constituting said top and several legs depending from said top in one piece with said top;
said top having an opening;
each of said several legs having an angled profile of said one piece of sheet material and in one piece with said top across the entire profile;
side panels of said one piece of sheet material;
each of said side panels depending from said top and extending between two of said several legs in one piece with the angled profile of said two legs, with each of said side panels solidly interconnected by a butt joint with each of said two legs.

18. A supporting structure as in claim 17, having apparatus located thereon, and
a conduit extending in between two of said legs and through said opening in said top and into said apparatus.

19. A supporting structure as in claim 18, including:
a support of said conduit on at least one of said legs.

20. A supporting structure as in claim 17 having apparatus located thereon,
a channel extending along two of said legs; and
a channel extension extending from said channel laterally in between said two legs and through said opening in said top and into said apparatus.

21. A supporting structure as in claim 20, wherein:
said channel extension has a curvature between said channel and said opening.

22. A rigid supporting structure having a top and several legs, comprising in combination:
one piece of sheet material constituting a top and several legs depending from said top in one piece with said top;
each of said several legs having an angled profile of said one piece of sheet material and in one piece with said top across the entire profile;
side panels of said one piece of sheet material;
each of said side panels depending from said top and extending between two of said several legs in one piece with the angled profile of said two legs, with each of said side panels solidly interconnected by a butt joint with each of said two legs;
said one piece of sheet material being a first piece of sheet material constituting said top as a first top and said several legs as a first set of several legs in a first supporting structure; and
including a second supporting structure interconnected with said first supporting structure and including a second piece of sheet material constituting a second top and a second set of several legs depending from said second top in one piece;
each leg of said second set of several legs having an angled profile of said second piece of sheet material and in one piece with said second top across the entire profile;
side panels of said second piece of sheet material;
each of the side panels of said second piece of sheet material depending from said second top and extending between two of said second set of several legs in one piece with the angled profile of said two legs of said second set, with each of the side panels of said second piece of sheet material solidly interconnected by a butt joint with each of said two legs of said second set.

23. A supporting structure as in claim 22, including:
a floor board interconnecting said first and second supporting structures.

24. A method of making from sheet material a rigid supporting structure having legs and a top, comprising in combination:
providing from said sheet material a pattern having a central portion for said top, first and second portions projecting from a first side of said central portion for first and second ones of said legs, third and fourth portions projecting from an opposite second side of said central portion for third and fourth ones of said legs, and first and second side panel portions projecting from opposed third and fourth sides of said central portion;

said first, second, third and fourth portions being provided, respectively, with lateral ledges of which each is spaced from an adjacent one of said first and second side panel portions by a notch extending to said central portion for a butt joint of each of said lateral ledges with an adjacent side panel portion;

forming angled structures for said legs from said first, second, third and fourth portions with lateral ledges;

orienting said angled structures relative to said central portion to provide said top with said legs while closing said notch by moving each of said lateral ledges into butt joint abutment with said adjacent side panel portion;

forming said side panel portions into side panels for said top between said legs; and solidly interconnecting said side panel portions by butt joints with next-adjacent ones of said lateral ledges of said first, second, third and fourth portions.

25. A method as in claim 24, including:
solidly interconnecting said lateral ledges through said butt joints with said top after forming said angled structures.

26. A method as in claim 24, including:
solidly interconnecting said side panel portions through butt joints with parts of said first, second, third and fourth portions adjacent the lateral ledges of said first, second, third and fourth portions.

27. A method as in claim 24, wherein:
said side panel portions are mitered at said butt joints with lateral edges of said first, second, third and fourth portions.

28. A method as in claim 24, wherein:
said notch spaces each of said lateral ledges from an adjacent one of said first and second side panel portions by a distance corresponding to a height of that adjacent side panel portion; and
said side panel portions are butt-jointed with said lateral ledges of said first, second, third and fourth portions.

29. A method as in claim 28, including:
solidly interconnecting said lateral ledges through butt joints with said top.

30. A method as in claim 28, including:
solidly interconnecting said side panel portions through butt joints with parts of said first, second, third and fourth portions adjacent the lateral ledges of said first, second, third and fourth portions.

31. A method as in claim 28, wherein:
said side panel portions are mitered at said butt joints with lateral edges of said first, second, third and fourth portions.

32. A method as in claim 24, wherein said pattern is provided with:
a third side panel portion between and seamlessly integral with said first and second ones of said legs; and
a fourth side panel portion between and seamlessly integral with said third and fourth ones of said legs;
said third and fourth side panel portions being also seamlessly integral with said central portion for said top.

33. A method as in claim 24, wherein:
said notch spaces each of said first and second side panel portions from an adjacent one of said lateral ledges by a distance corresponding to a width of that lateral ledge; and
said side panel portions are butt-jointed with said lateral ledges of said first, second, third and fourth portions.

34. A blank of sheet material for a rigid supporting structure having legs and a top, comprising in combination:
a pattern having a central portion for said top, first and second portions projecting from a first side of said central portion for first and second ones of said legs, fourth and fifth portions projecting from an opposite second side of said central portion for third and fourth ones of said legs, and first and second side panel portions projecting from opposed third and fourth sides of said central portion;
said first, second, third and fourth portions having, respectively, lateral ledges of which each is spaced from an adjacent one of said first and second side panel portions by a notch extending to said central portion for said top for a butt joint of each of said lateral ledges with an adjacent side panel portion.

35. A blank as in claim 34, wherein:
each of said lateral ledges is spaced from an adjacent one of said first and second Side panel portions by a distance corresponding to a height of that adjacent side panel portion.

36. A blank as in claim 34, including:
a third side panel portion between and seamlessly integral with said first and second ones of said legs; and
a fourth side panel portion between and seamlessly integral with said third and fourth ones of said legs;
said third and fourth side panel portions being also seamlessly integral with said central portion for said top.

37. A blank as in claim 34, wherein:
each of said first and second side panel portions is spaced from an adjacent one of said lateral ledges by a distance corresponding to a width of that lateral ledge.

38. A blank of sheet material for a rigid supporting structure having legs and a top, comprising in combination:
a pattern having a central portion for said top, first and second portions projecting from a first side of said central portion for first and second ones of said legs, fourth and fifth portions projecting from an opposite second side of said central portion for third and fourth ones of said legs, and first and second side panel portions projecting from opposed third and fourth sides of said central portion;
said first, second, third and fourth portions having, respectively, lateral ledges of which each is spaced from an adjacent one of said first and second side panel portions by a V-shaped notch extending to said central portion for said top for a butt joint of each of said lateral ledges with an adjacent side panel portion.

39. A blank of sheet material for a rigid supporting structure having legs and a top, comprising in combination:
a pattern having a central portion for said top, first and second portions projecting from a first side of said central portion for first and second ones of said legs, fourth and fifth portions projecting from an opposite second side of said central portion for third and fourth ones of said legs, and first and second side panel portions projecting from opposed third and fourth sides of said central portion; said first, second, third and fourth portions having, respectively, lateral ledges of which each is spaced from an adjacent one of said first and second side panel portions by a rectangular notch extending to said central portion for said top for a butt joint of each of said lateral ledges with an adjacent side panel portion.

40. A rigid supporting structure having a top and several legs comprising in combination:
 one piece of sheet material constituting a top and several legs depending from said top in one piece with said top;
 each of said several legs having an angled profile of said one piece of sheet material and in one piece with said top across the entire profile;
 side panels of said one piece of sheet material;
 each of said side panels depending from said top and extending between two of said several legs in one piece with the angled profile of said two legs; and
 each of said side panels having a butt joint weld at each of said two legs.

41. A rigid supporting structure having a top and several legs, comprising in combination:
 one piece of sheet material constituting said top and several legs depending from said top in one piece with said top;
 each of said several legs having an angled profile of said one piece of sheet material and in one piece with said top across the entire profile;
 side panels of said one piece of sheet material;
 each of said side panels depending from said top and extending between two of said several legs in one piece with the angled profiles of said two legs; and
 a pair of butt joints solidly interconnecting each of said side panels with each of said two legs;
 said butt joints extending at angles to each other and extending between said side panels and said legs to said top.

42. A supporting structure as in claim 41, wherein:
 said butt joints extend at right angles to each other.

43. A supporting structure as in claim 41, wherein:
 said butt joints extend between each of said side panels and an adjacent one of said legs and between a portion of said adjacent one leg and said top.

44. A supporting structure as in claim 41, including:
 further side panels of said one piece of sheet material extending between and seamless by interconnected with said legs.

* * * * *